Figure 2:
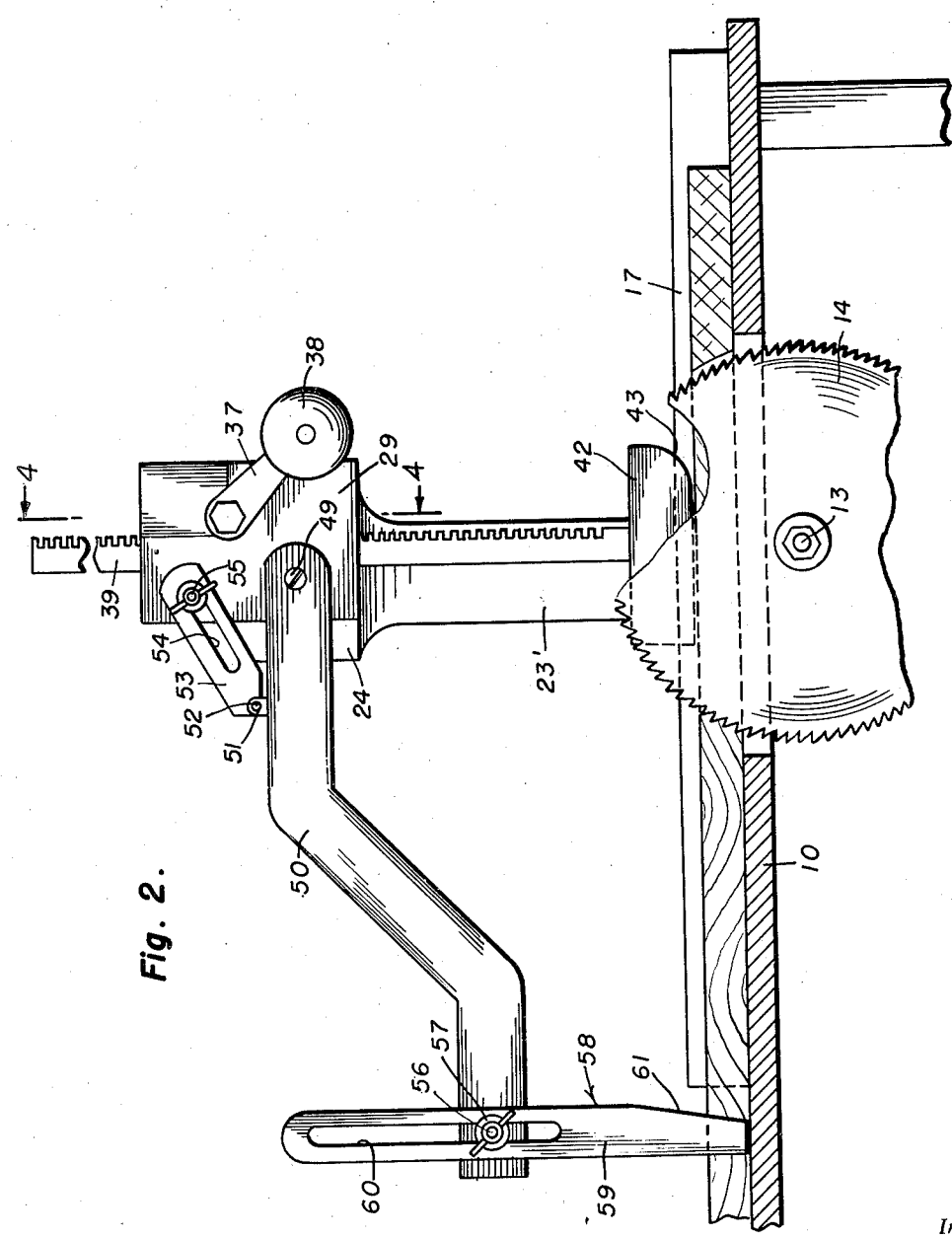

Aug. 23, 1949.   J. BUNKOVSKY   2,479,998
PRESSER FOOT AND KERF SPREADER FOR POWER SAWS
Filed March 13, 1947   3 Sheets-Sheet 1
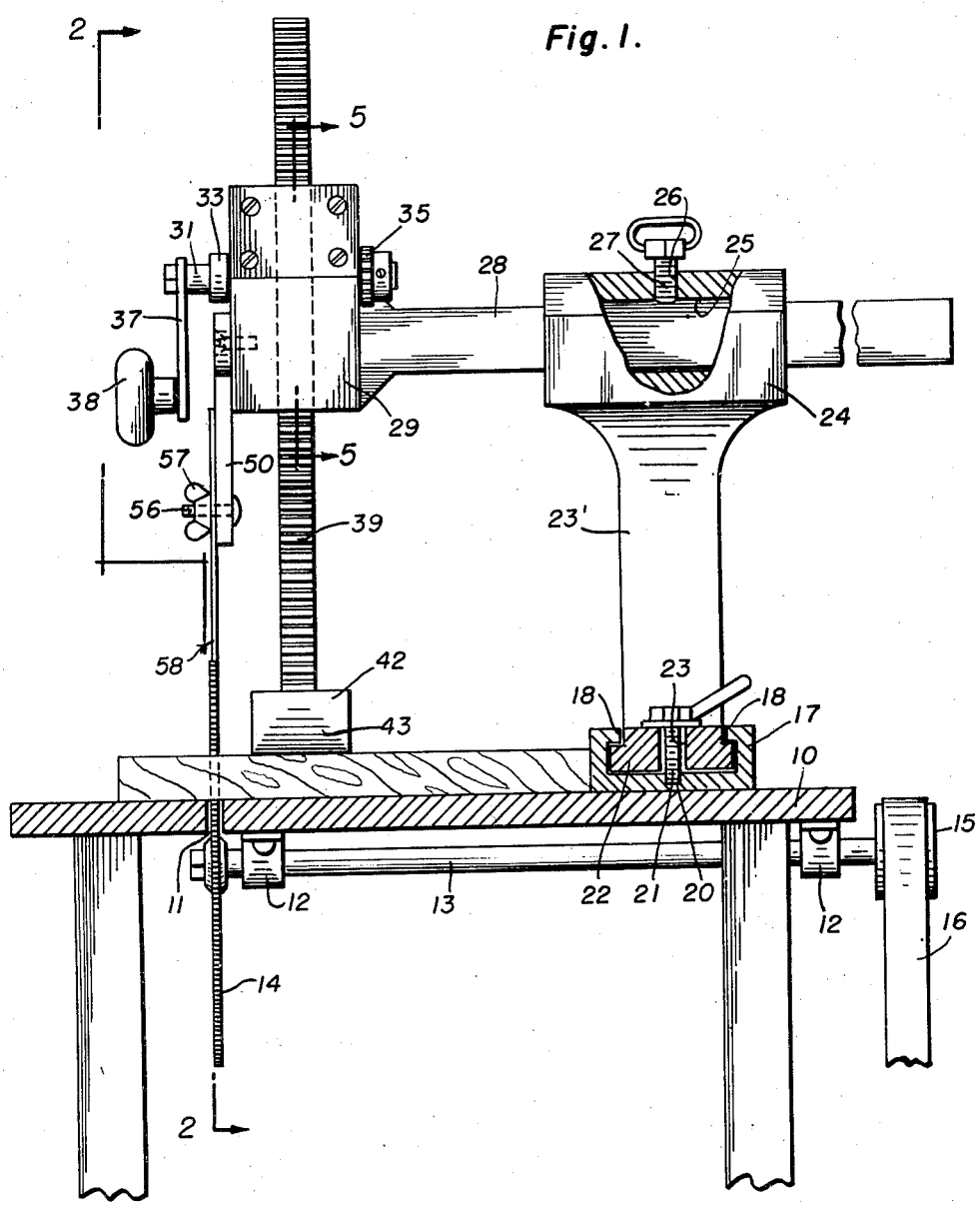
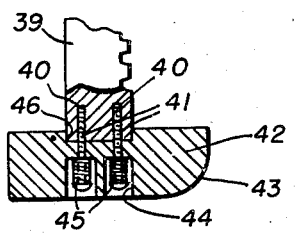
Inventor
Joseph Bunkovsky Aug. 23, 1949.　　　　J. BUNKOVSKY　　　　2,479,998
PRESSER FOOT AND KERF SPREADER FOR POWER SAWS
Filed March 13, 1947　　　　　　　　　　3 Sheets-Sheet 2

Inventor
Joseph Bunkovsky

By Clarence A. O'Brien
and Harvey B. Jacobson
Attorneys

Aug. 23, 1949. J. BUNKOVSKY 2,479,998
PRESSER FOOT AND KERF SPREADER FOR POWER SAWS
Filed March 13, 1947 3 Sheets-Sheet 3

Inventor
Joseph Bunkovsky

By Clarence A. O'Brien
and Harvey B. Jacobson
Attorneys

Patented Aug. 23, 1949

2,479,998

UNITED STATES PATENT OFFICE 2,479,998

PRESSER FOOT AND KERF SPREADER
FOR POWER SAWS

Joseph Bunkovsky, New York, N. Y.

Application March 13, 1947, Serial No. 734,436

1 Claim. (Cl. 143—157)

This invention relates to a presser foot and kerf spreader for a power saw and has for its primary object to hold work firmly against the saw table of a power saw to prevent its chattering.

Another object is to conserve energy and keep the saw blade from running hot, by holding the kerf made in the work open as the work is advanced through the saw.

The above and other objects may be attained by employing this invention which embodies among its features a guide channel adapted to be attached to a saw table near a saw blade, a pedestal mounted in the guide for adjustment longitudinally thereof, an arm mounted on the pedestal for adjustment in a plane parallel with the saw table, a presser foot carried by the arm for engagement with work as it is advanced along the table against the saw blade and a kerf spreader carried by the arm and lying in a plane with the saw blade.

Figure 3:
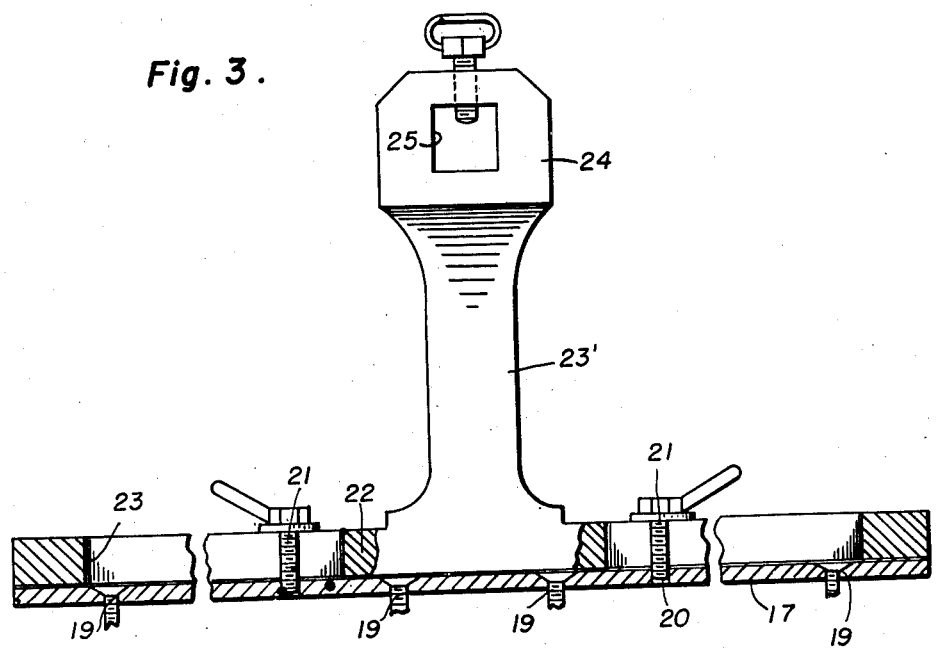
Figure 5:
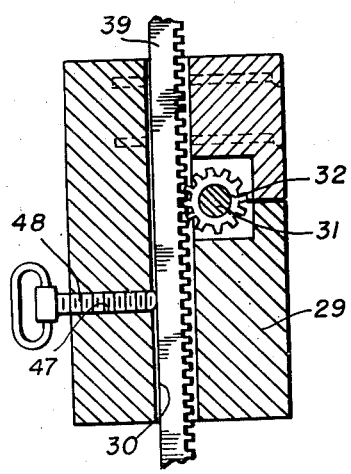
Figure 4:
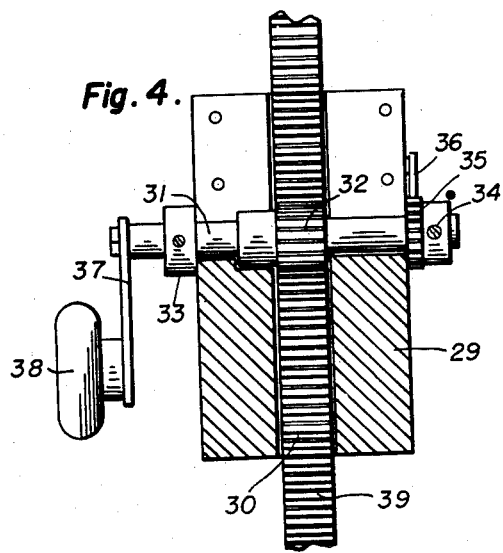

In the drawings,

Figure 1 is a sectional view through a saw table illustrating a saw mounted thereon, and this improved presser foot and kerf spreader in position on the table, Figure 2 is a vertical sectional view taken substantially along the line 2—2 of Figure 1, Figure 3 is a side view of the pedestal, and the guide channel, the latter being shown in section, more clearly to illustrate certain details of construction, Figure 4 is a vertical sectional view taken substantially along the line 4—4 of Figure 2 on a slightly enlarged scale, Figure 5 is a vertical sectional view taken substantially along the line 5—5 of Figure 1 on a slightly enlarged scale, and Figure 6 (Sheet 1) is a fragmentary sectional view through the presser foot and the lower end of the support therefor.

Referring to the drawings in detail, a saw table 10 is equipped with a conventional saw slot 11, bearings 12 and a shaft 13 which is mounted to rotate in the bearings and carries adjacent one end a saw blade 14 which operates through the slot 11 in a conventional manner. A drive pulley 15 is carried on the end of the shaft 13 opposite that carrying the blade 14 and is driven in a conventional manner through the medium of a drive belt 16. Obviously, instead of the conventional circular saw blade 14 above referred to, a conventional band saw blade and table may be employed with the table equipped with conventional driving means therefor.

My improved saw attachment comprises a channel-shaped guide 17, the upper edges of the legs of which are provided with inturned flanges 18, while the bight portion is formed with countersunk screw receiving openings 19 for the reception of attaching screws by means of which the channel is fixed to the upper surface of the saw table 10 in spaced relation to the saw blade 14. Formed in the bight portion of the channel 17 are spaced threaded openings 20 for the reception of lock screws 21, the purpose of which will be more fully hereinafter described.

Mounted for longitudinal sliding movement in the channel 17 between the flanges thereof, and beneath the overhanging flanges 18 is a foot-piece 22 provided with longitudinally spaced slots 23 which open through the foot-piece for the reception of the screws 21 previously referred to. Rising from the foot-piece 22 intermediate its ends is a pedestal 23 provided at its upper end with a head 24 formed with a rectangular opening 25, the axis of which is perpendicular to the axis of the foot-piece 22, and lies parallel with the table 10. Formed in the head 25 intermediate its ends and in axial alignment with the pedestal 23 is an internally screw threaded opening 26 for the reception of a thumbscrew 27.

Fitted in the rectangular opening 25 is a rectangular arm 28 formed at one end with a head 29 having a rectangular opening 30 therein which lies parallel with the vertical axis of the pedestal 23. Journalled in the head 29, and lying perpendicular to the axis of the opening 30 is a shaft 31 to which is fixed intermediate its ends a pinion 32, the periphery of which extends into the opening 30 for a purpose to be more fully hereinafter explained. A stop collar 33 is fixed to the shaft near one end, and fixed to the shaft adjacent its opposite end as by a set screw 34 is a ratchet wheel 35. A pawl 36 is pivoted to the head 29 for engagement with the ratchet wheel to prevent the shaft 31 from rotating in one direction when the pawl engages the wheel. A crank arm 37 is fixed to the end of the shaft 31 opposite that carrying the ratchet wheel 35, and is provided with a handle 38 by means of which the shaft 31 may be rotated.

Mounted for sliding movement in the opening 30 in the head 29 is a rack 39, the teeth of which are adapted to mesh with the teeth 32, so that as the shaft 31 is rotated the rack 39 will be moved along a vertical axis which lies parallel with the plane of the saw blade 14. The lower end of the rack 39 is provided with internally screw-threaded openings 40 for the reception of attaching screws 41 by means of which a foot 42 is secured to the rack 39. The forward end of the foot 42, i. e. that which faces work being advanced toward the saw blade is curved as at 43, and formed in the foot intermediate its ends are openings which align with the screw-threaded openings 40 and terminate at their lower ends in countersinks 44 for the reception of the heads of the screws 41. Surrounding the screws 41 between the heads thereof and the inner ends of the countersinks 44 are compression coil springs 45 which serve yieldingly to hold the foot 42 against the lower end of the rack 39. A socket 46 conforming to the shape of the lower end of the rack is formed in the upper side of the foot 42, and as illustrated in Figure 6, receives the lower end of the rack. It will thus be seen that by rotating the crank arm 39, the shaft 31 will be rotated, and the foot 42 may be forced against the upper side of the work being advanced toward the saw blade with a selected degree of pressure. In order to lock the rack in proper adjusted position within the head 29, the head is formed with an internally screw-threaded opening 47, the axis of which lies perpendicular with the axis of the opening 30, and extending through the opening 47 is a thumbscrew 48, the inner end of which bears against the rack 39 to lock the rack against movement.

Pivotally supported as at 49 on the end of the head 29 to swing in an arc which lies in a plane parallel with the saw blade 14 is a bracket arm 50. This bracket arm is provided intermediate its ends with an upwardly extending ear 51 to which is pivoted as at 52 a link 53 which is provided with an elongated slot 54 for the reception of a thumbscrew 55 which is threaded into the head 29 near the pivot point 49 of the bracket arm 50. By loosening the thumbscrew 55 the bracket arm may be moved into a desired position and upon tightening the screw 55 the bracket arm will be held against further movement about the pivot 49. Extending through the bracket arm adjacent the end opposite that which is pivoted at 49 is a bolt 56 upon which is threaded a wing nut 57 by means of which a kerf spreader designated generally 58 is held at various adjusted positions on the arm 50. This kerf spreader comprises a blade 59 formed with an elongated longitudinal extending slot 60 for the reception of the bolt 56, and the lower end of the kerf spreader is provided with an inclined forward face 61 which is turned in the direction of the saw blade 14.

In use, the channel 17 is attached to the table 10 by flat head screws passing through the countersunk openings 19 at the desired distance from the saw 14. The foot 22 is adjusted to the desired position within the channel 17 to bring the pedestal 23 into proper relation to the saw blade 14. Upon loosening the thumbscrew 27 the arm 28 may be adjusted to bring the kerf spreader into a plane with the plane of the saw blade 14, and thus position the presser foot 43 at a point with relation to the saw blade that will prevent the work being advanced toward the saw blade from chattering. Having thus adjusted the kerf spreader and arm 28, a piece of work is advanced toward the saw and the crank arm 39 is rotated to lower the presser foot 42 into contact with the upper surface of the work. When the desired degree of pressure is reached, the thumbscrew 48 is rotated to cause its inner end to impinge against the rack bar 39, and lock the presser foot 42 against movement. The angular position of the bracket arm 50 is then adjusted by rotation of the thumbscrew 55 and swinging the arm to the desired position about its pivot 49, after which the thumbscrew 55 is tightened and the arm will be held in its proper place. The kerf spreader 58 is then adjusted so that its lower end rests upon the upper surface of the table 10 in a plane with the saw blade 14 and as work is advanced through the machine and toward the saw it will encounter the presser foot 42 which will serve to prevent it from chattering, and at the same time the kerf spreader 58 will hold the incision formed in the work by the saw against contraction, and thus pinching of the saw blade will be avoided.

While in the foregoing there has been shown and described the preferred embodiment of this invention it is to be understood that minor changes in the details of construction, combination and arrangement of parts may be resorted to without departing from the spirit and scope of the invention as claimed.

I claim:

A presser foot and kerf spreader for a power saw comprising a guide channel detachably mounted on a saw table in spaced parallel relation to a saw blade, a pedestal mounted in the guide for adjustment longitudinally thereof, an arm mounted in the pedestal for adjustment horizontally in vertically spaced parallel relation to the table, a pinion mounted in the arm adjacent the saw blade to rotate about an axis perpendicular to the saw blade, a rack bar mounted in the arm to move along a vertical axis adjacent the saw blade, said rack bar meshing with the pinion, a work engaging presser foot at the lower end of the rack bar for contacting work adjacent the saw blade, a set-screw entering the arm and bearing on the rack bar to lock said bar against vertical movement, a bracket arm pivotally mounted on the end of the arm for movement in a vertical arc adjacent the saw blade, means carried by the bracket arm and adjustably connected to the arm for holding said bracket arm in various positions in its arc of movement, and a kerf spreader mounted on the bracket arm for adjustment in a vertical path which lies directly behind the saw blade.

JOSEPH BUNKOVSKY.

REFERENCES CITED

The following references are of record in the file of this patent:

UNITED STATES PATENTS

| Number | Name | Date |
| --- | --- | --- |
| 252,269 | Sill | Jan. 10, 1882 |
| 261,928 | Jack | Aug. 1, 1882 |
| 266,466 | Groff | Oct. 24, 1882 |
| 1,090,063 | Hook | Mar. 10, 1914 |
| 1,125,637 | Beaudry | Jan. 19, 1915 |
| 1,616,478 | Watson | Feb. 8, 1927 |

FOREIGN PATENTS

| Number | Country | Date |
| --- | --- | --- |
| 3,305 | Great Britain | Feb. 20, 1900 |